United States Patent
Rothermel, Jr.

[11] 3,769,178
[45] Oct. 30, 1973

[54] METHOD AND APPARATUS FOR END POINT DETECTION IN POTENTIOMETRIC TITRATION

[75] Inventor: Charles E. Rothermel, Jr., Waynesboro, Va.

[73] Assignee: Rothermel Associates, Inc., Waynesboro, Va.

[22] Filed: Apr. 27, 1972

[21] Appl. No.: 248,092

[52] U.S. Cl. .............. 204/1 T, 23/230 R, 23/253 R
[51] Int. Cl. ........................................... G01n 27/46
[58] Field of Search ..................... 23/230 R, 232 E, 23/253 R, 254 E; 204/1 T, 195 T; 324/30 C

[56] References Cited
UNITED STATES PATENTS
3,157,471  11/1964  Harrison .......................... 23/230 R
3,162,585  12/1964  De Ford et al. .................... 204/1 T
3,506,405  4/1970   Christie et al. .................... 23/253 R
3,578,408  5/1971   Sirois et al. ....................... 23/253 R OTHER PUBLICATIONS
Phillips, "Automatic Titrators," 1959, Academic Press, pp. 74–80.

Primary Examiner—T. Tung
Attorney—Harris C. Lockwood

[57] ABSTRACT

A method of automatically determining the end point of a potentiometric titration and apparatus for carrying out the method are disclosed. A titrant is added to a solution at a measured rate by a motor-driven burette. A counter and a count accumulator are provided to record the amount of titrant added to the sample and means are provided to measure changes in the pH of the sample as the titrant is added. The count representing the volume of titrant is recorded until a preset threshold point is reached, this point being determined by a voltage representing the first derivative of the changing pH potential in the sample. The occurrence of the threshold point changes the counter and count accumulator so that only one-half of the actual count is registered in the accumulator. The titration continues beyond the normal end point until the first derivative value returns to the threshold point, at which time the titration ends. The count in the accumulator at this time provides a direct reading of the volume of titrant added to the end point, thereby providing a fast and accurate determination of the end point. The half count technique is applicable to any titration that can be carried out by standard or developed potentiometric procedures.

44 Claims, 11 Drawing Figures

METHOD AND APPARATUS FOR END POINT DETECTION IN POTENTIOMETRIC TITRATION

BACKGROUND OF THE INVENTION

The present invention relates, in general, to a system for detecting the end point of a potentiometric titration, including both the method and apparatus for carrying out such a procedure. More particularly, the invention relates to half count technique for obtaining direct indications of the exact volume of titrant delivered at the end point of a titration procedure, the indication being provided automatically, without the need for laborious and time-consuming graphical analysis.

In the field of electroanalysis, wherein electrical variables are experimentally controlled so as to produce an electrical response dependent in some manner upon the composition of a solution, the general use of potentiometric methods are well known. Potentiometry refers to the use of the measured potential of a cell to determine a solution concentration, and in a potentiometric titration, the measured cell potential is used to monitor the solution concentration of the sample species during the course of a titration involving that species. This type of analysis offers high accuracy because only relative changes in cell potential during the titration are important, and variations in absolute values can be ignored. Numerous methods have been devised to permit detection of the end point and measurement of the amount of titrant added in a potentiometric titration to be accomplished automatically. Present day automatic titrators produce either a recording of the entire titration curve, or simply a single volume reading denoting the equivalence point volume.

In the curve-recording type of automatic device, titrant is delivered by means of a motor-driven syringe, or burette, through a capillary whose tip is immersed in a rapidly stirred solution. The motor drive is coupled to the drive mechanism of a recording potentiometer, with the recording chart divisions being directly related to the titrant delivered. The measured potential variations are automatically plotted on the chart, and by inspection of the curve so plotted, the entrance and exit of the steep portion of the curve in which the inflection occurs can be located. By taking half the distance between these points, a close estimate of the end point can be obtained. One of the main advantages of an automatic titrator is that a large number of similar titrations can be performed in a short period of time, but the requirement for manual determination of the end point in each case obviates this advantage. In addition, poor results can occur if there is a slow attainment of equilibrium in the solution during the titration, or if the mixing rate is inadequate. This problem can be overcome to some extent by the use of an "anticipation" technique wherein the rate of titrant addition is automatically slowed as the equivalence point is approached; however, this does not entirely eliminate it, for the slower rate itself introduces errors and also reduces the advantage of the automatic system. It should also be noted that in many titrations, the points of inflection on the plotted curve are very difficult to locate with any accuracy, and this introduces further error in the measurements.

In the type of automatic titrator where a single volume reading is provided to denote the equivalence point, it is usual to provide means for stopping the titrant flow at the end point, and to provide an indication of the total volume delivered. Normally such devices employ a potentiometer which is set at the end-point potential for the titration so that when the cell potential equals or slightly exceeds the present voltage, a relay is actuated to stop titrant flow. An anticipation technique can also be used in conjunction with this method, so that as the end point is approached, the flow of titrant is reduced. Such a system generally performs very well in standard aqueous titrations; however, in practice it has been found that in organic and non-aqueous solutions this type of system tends to fail. Such failures usually stem from the inevitable fluctuations in electrode potential caused by drift, noise, and general instability of the electrodes themselves. In order to overcome such problems, it has been the practice to utilize either the first derivative or the second derivative of the cell potential, rather than using the cell voltage directly. The use of a second derivative sensing circuit has been favored since it has the advantage that the exact nature of the titration curve need not be known, and the form of the second derivative itself can be used to anticipate the end point and shut off titrant flow when its value becomes zero. However, the second derivative is particularly susceptible to noise problems, for as the second derivative approaches the cut off point, superimposed noise signals can either advance or delay the cut off of the titrant flow and thus invalidate the test.

SUMMARY OF THE INVENTION

Accordingly, it is an object of the present invention to provide an improved method and apparatus for determining the end point of a titration and for providing an automatic and accurate indication of the volume of titrant.

It is another object of the present invention to provide an automatic potentiometric titration which will provide a direct and accurate indication of the volume of titrant added at an accurately determined end point.

It is a further object of the present invention to provide an automatic potentiometric titration which overcomes the problems encountered in prior devices whereby fast and accurate determinations of end points can be carried out for a large number of samples.

It is another object of the present invention to provide a method for conducting automatic potentiometric titrations without the need for providing an arbitrary predetermined end point, and which eliminates the delays inherent in techniques which involve the manual plotting of measured data.

In the numerous attempts that have been made in the past to produce an accurate and reliable automatic potentiometric titrator, various approaches have been taken as generally outlined above, but none have been entirely satisfactory. For example, where samples taken from an industrial process are to be titrated in order to provide a continuous monitoring of the process, the use of a graphical analysis is totally inadequate, for a considerable amount of time is required to study the charts produced by the titrator and obtain a reading of the values. The titrators which work to a preset cell potential, and stop the titration when that potential is reached, are unacceptable for such systems since in non-aqueous and organic samples the titrations are not reproducible and a large number of invalid tests can result from this approach. Similarly, the use of the second derivative in such systems increases the chance for error since the effects of noise and drift become more evident as the rate of titration is slowed in an attempt to obtain greater accuracy. However, it has been discovered that in any titration in which there is a potentiometric break in the curve representing the cell potential as a sample is titrated through the end point of the titration, a plot of the first derivative of that break will show an area of symmetry about a predetermined, or threshold level. Even if the curve is irregular or very broad, there will still be a portion of the first derivative curve that will be generally symmetrical above the threshold value.

Since the peak of the first derivative curve occurs at the point of maximum change in the cell potential, which point is the end point, or equivalence point, to be determined, it will now be seen that this characteristic of symmetry in the first derivative can be utilized to determine the end point of the titration. This is accomplished by measuring and accumulating a count corresponding to the full volume of titrant added to a sample until the threshold value is reached; thereafter a count corresponding to one-half of the volume of titrant added as the solution is overtitrated is accumulated, with the count stopping when the value of the first derivative returns to the threshold value. The curve representing the first derivative of the pH variation is used to control the accumulation of one-half the measured volume of titrant through the symmetrical portion of the curve, for it has been found that one-half of the total volume added during this over-titration, taken with the full count accumulated up to the threshold, will provide an accurate measure of the volume of titrant required to reach the midpoint of the derivative curve; i.e., to reach the equivalence point of the titration. This method, which is referred to herein as the half-count technique, provides more precise measurements of titration than was possible with prior automatic devices, giving an accuracy that was previously available only through laborious plotting of measured values and calculating the end point from a careful measurement of the slope of the curve so obtained. Furthermore, the present device is able to provide this accuracy with much greater speed and reliability than was previously thought possible, and eliminates the need for the highly trained technicians who were required, under such previous methods, to carry out the various calculations.

To perform the half-count procedure, the present invention utilizes a standard motor-driven syringe for adding titrant to a sample. A digital counter makes an accurate measure of the exact volume of titrant dispensed by the syringe and feeds this information to an appropriate accumulator. Electrodes are provided in the sample being titrated, and electrical circuit means are provided for obtaining the first derivative of the potential measured by these electrodes. A motor-driven burette is operated at a fast speed until a predetermined count representative of a predetermined volume of titrant added to the sample, is obtained; the speed of the drive motor is then reduced so that the titrant is added more slowly, and when a selected threshold value of the first derivative voltage is reached, the digital counter is modified so that only one-half of the measured count is fed to the accumulator. The titration continues in this manner until the equivalence point is passed and the value of the first derivative returns to the threshold value, at which time the drive motor is turned off and the accumulator displays the accumulated count. This count represents the actual volume of titrant added to the sample to reach the equivalence point, thus providing an accurate, fast readout of the result of the titration.

In a particular embodiment of the invention concept, the test samples may be taken from an industrial process at predetermined intervals and placed in receptacles on a turntable. Suitable solvents may be added to the test material, and the receptacles then indexed in turn to the titrating station where the electrodes are lowered into the receptacle, a stirring bar is activated to agitate the sample and the titration begins. A predetermined quantity of titrant is added to the sample at a very rapid rate, under the control of a fast motor driving the burette. Thereafter, the motor is slowed down and the titrant added at a slow rate until the threshold value is reached. At this point, the volume measuring apparatus shifts to a half-count and continues in this manner through the end point until the titration is complete and the motor is stopped. The accumulated count indicating the volume required to reach the equivalence point is then displayed or printed out, the electrodes are removed from the test sample, the sample is discarded and the next sample is indexed into position.

Although the present application is directed to a system for carrying out a titration having a single break in the curve indicating the relationship between pH (voltage) and volume of titrant added, it will be apparent from what follows that the process is equally applicable to a titration of a complex sample wherein two breaks occur in the titration curve as the titrant is added. In these situations, the volume added between the equivalence point of the first break and that of the second break is the value of interest, and it therefore becomes necessary to modify the counting mode of the measuring system. Thus, as the first derivative curve increases above the threshold value for the first time, corresponding to the occurrence of the first break, a half-count is initiated. This continues until the curve falls below the threshold value, at which time a full count begins until the threshold is again exceeded at the second break. A half-count again is used until the first derivative falls below the threshold value for a second time, at which time the titration stops and the accumulated value is displayed, this value being the volume of titrant added from the end point of the first break to the end point of the second break.

BRIEF DESCRIPTION OF THE DRAWINGS

The foregoing and additional objects, features and advantages, together with various modifications of the present invention will become evident from a consideration of the following specification and claims, taken in conjunction with the accompanying drawings, in which:

DESCRIPTION OF PREFERRED EMBODIMENTS

Figure 1:
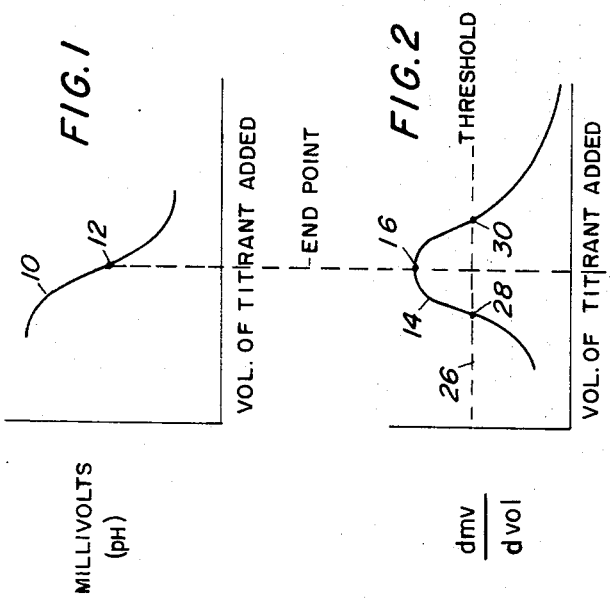
FIG. 1 is a diagrammatic illustration of a typical titration curve.

Turning now to a consideration of FIG. 1, there is illustrated therein at 10 a typical titration curve of the type that is obtained in the conventional potentiometric titration of any material that can be successfully subjected to analysis of this type under standard and well-known potentiometric techniques. This curve represents a plotting of the potential measured across a pair of electrodes immersed in the sample being tested, the potential being in millivolts and proportional to the pH of the sample, versus the volume of standard titrant added to the sample. Such curves are commonly used to determine the "end point" of a titration, which is defined as being the point on the curve where the potential is changing most rapidly, and is indicated in the figure at 12. The illustration is of a titration in which the sample experiences a decreasing pH, resulting in a positive-going first derivative.

In a graphical determination of the end point, the entrance and exit points of the steep portion of the curve are determined by inspection, and one-half the distance between these points is taken as the best estimate of the end point. Although this technique can produce satisfactory results when the curve is well defined, as in the example of FIG. 1, in many cases the slope of the curve may be somewhat irregular and poorly defined, and in such a situation it is often necessary to plot a large number of tangents to the curve and from their points of intersection determine the desired point of maximum change.

Figure 2:
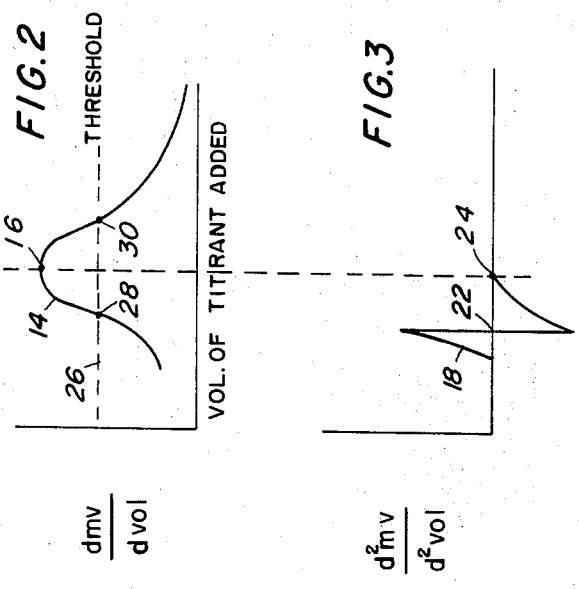
FIG. 2 is a diagrammatic illustration of curve representing the first derivative of the titration curve of FIG. 1.
Figure 3:
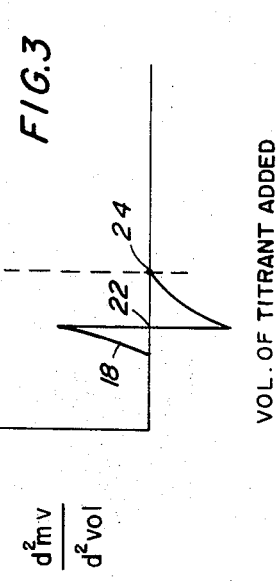
FIG. 3 is a diagrammatic illustration of a curve representing the second derivative of the curve of FIG. 1.

Although the graphical method of end point determination can be very accurate, it will be apparent that it is also highly time consuming, and experienced, highly trained personnel are required if good results are to be obtained. Although the plotting of the curve can be done automatically, the accurate determination of the end point is not well adapted to automation, and for this reason the art has turned to the use of mathematically or electrically obtained first derivative or second derivative cruves, such as those illustrated in FIGS. 2 and 3, respectively. As will be seen from the FIG. 2 illustration, the first derivative 14 of the titration curve provides a peak at the area of the titration curve wherein the pH is changing most rapidly, and this provides a highly accurate determination of the end point 16, in theory. Similarly, the second derivative 18 also provides a high degree of theoretical accuracy in that the second derivative changes from a negative to a positive value at the desired end point. Although the use of first and second derivatives has increased the speed with which the results of a potentiometric titration can be obtained, and has facilitated to some extent the automation of such systems, nevertheless, for a number of reasons, the theoretical accuracy of such techniques has not been obtained. For example, by the very nature of chemical reactions, minor disturbances prevent the generation of an ideal curve, thus complicating the graphical determination and introducing errors into the derivative values. Further, the potential change in a given reaction may exhibit an almost constant rate of change near the center of the steep slope, thus preventing an accurate determination of the area of maximum change either by a graphical method or by a first derivative method. As will be seen from FIG. 3, the second derivative crosses the zero axis two times, at 22 and 24, during the titration, with the second crossing 24 being at the point of interest. An automatic machine made sensitive to this second crossing is particularly susceptible to noise and interference; for example, on the downward sloping portion of the curve, in the area of the zero crossing 22, noise can superimpose an upward going signal which would cross the zero axis and trigger the sensing equipment before the actual end of the titration is reached at point 24. Thus it has been extremely difficult to devise a machine which will be sensitive to the exact end point of a titration, thereby to provide with the required degree of accuracy and speed an indication of the titrant added to a sample.

However, the present invention permits an accuracy of operation approaching that of the theoretical values in an automatic machine. This accuracy is based upon the recognition that virtually every first derivative curve exhibits a high degree of symmetry about the end point and above a determinable threshold level. This threshold level may vary for different curves, but it has been found that a practical value can be established for a given type of titration with sufficient reliability to permit automatic and accurate determination of the end point by a half-count technique. Thus, the symmetry of the first derivative curve is such that as the first derivative curve increases above a threshold level 26, as at point 28, passes through the end point 16 and declines again to the threshold level, as at point 30, the amount of titrant added to the sample between points 28 and 30 may be divided in half to find the amount of titrant added between point 28 and end point 16. Because of the symmetry, then, one-half the volume between the threshold cross over points gives the value of the end point, and when this value is added to the full amount of titrant metered into the sample to reach the threshold value, the sum will be the total volume of titrant added to the end point.

This method is carried out in the present invention by the provision of means for measuring with great accuracy the amount of titrant added to a sample and then by accumulating a digital count corresponding to the measured volume. As the titrant is added, the measured potential across the electrodes follows curve 10 in FIG. 1 and its first derivative follows curve 14 in FIG. 2. The total amount of titrant added is accumulated until the first derivative of the potential reaches the selected threshold value at point 28 (FIG. 2). From this point through the actual end point and to the second threshold point 30, only one-half of the measured volume count is added to the previous total; at point 30, both the titration and the count are stopped. The accumulated value is then equal to the total volume of titrant added up to the end point 16, thus giving a direct reading of the end point. Since the accuracy of this technique depends on the symmetry of the first derivative potential curve in the area of interest, it is desirable to set the threshold value 26 as near the peak of the curve as possible. However, variations in electrode sensitivity, random electrode potential fluctuations, and the like establish a practical limit for reliable operation.

Figure 4:
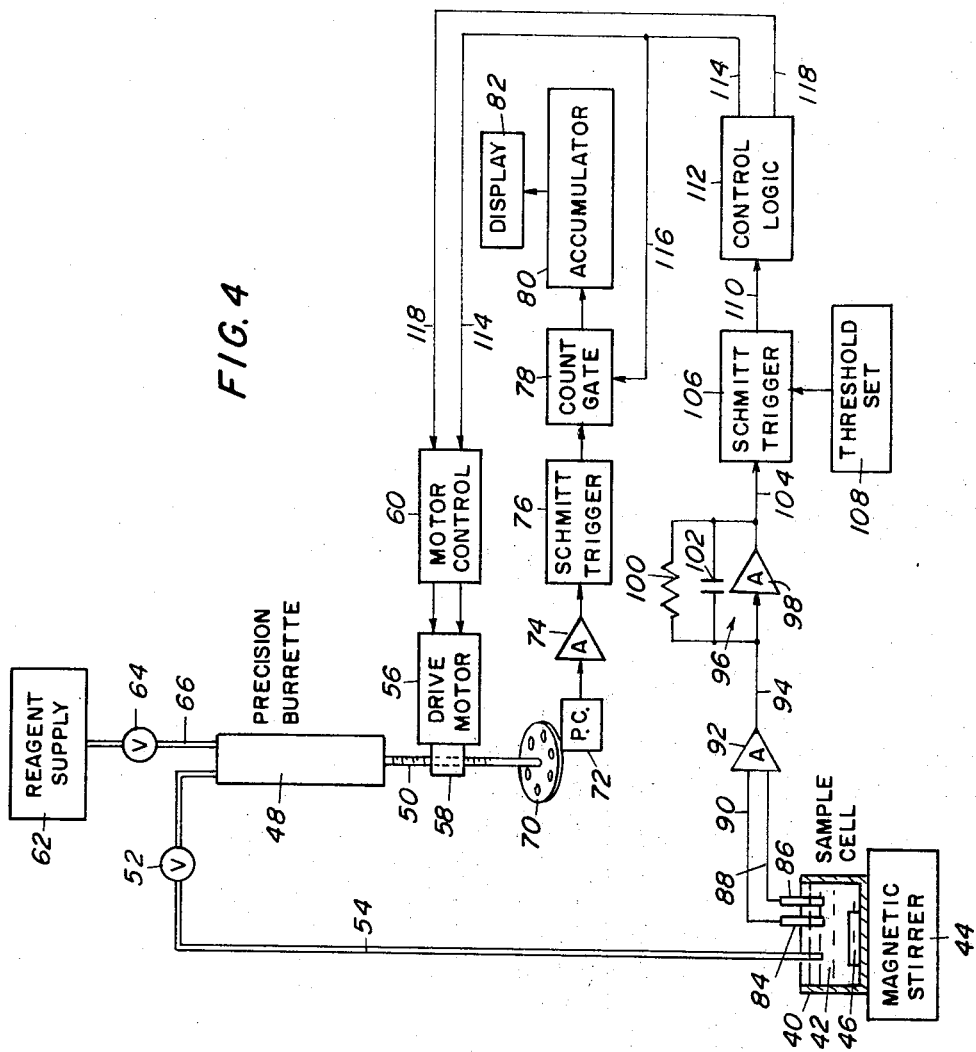
FIG. 4 is a diagrammatic illustration of a system for automatic titration utilizing the half-count method of the present invention.

Referring now to the diagrammatic illustration of FIG. 4, there is illustrated in diagrammatic form a system and apparatus for carrying out the half-count technique of the present invention. Accordingly, there is illustrated at 40 a sample cell or cup which is designed to receive a sample 42 of the material which is to be titrated. The sample may include any solvents or other materials necessary to the carrying out of the titration, as is known in the art. Preferably, the cell will include a suitable stirring mechanism such as the magnetic stirrer 44 which will serve to agitate the mixture and keep it uniform during the titration. The stirrer may include bar 46 of magnetic material which may be inserted in the cup and rotated or otherwise moved in the bottom of the cup by stirrer 44, again as is conventional.

The apparatus further includes a precision burette 48 which is driven by the rotation of a micrometer screw 50 to deliver metered quantities of titrant by way of a valve 52 and a feed tube 54 to the sample cell. The micrometer screw 50 is operated by a suitable drive motor 56 and drive gear 58 to advance or retract the burette piston in accordance with the output of a motor control circuit 60. Preferably, a two-speed, reversible drive motor is used to permit the burette to be advanced at a rapid rate until the inflection point of the titration curve is approached, at which time the speed is reduced so as to add titrant to the sample at a very slow rate through the end point. The motor preferably is reversible to permit the burette to draw in a supply of titrant from a suitable reagent supply source 62, by way of inlet valve 64 and supply tubing 66.

In order to provide an accurate measure of the volume of titrant added during operation of the burette, a counting mechanism is connected to the micrometer screw. As illustrated, this mechanism may take the form of a perforated disc mounted on the end of screw 50 and rotatable therewith. The perforations in the disc are spaced equally around the disc 70 at equal radial distances, and a photocell arrangement 72 is provided adjacent the surface of the disc to provide an output pulse as each perforation passes the photocell. Each output pulse thus corresponds to the rotation of disc 70 through a prescribed number of degrees, and thus corresponds to the injection of a prescribed amount of titrant through tube 54 into the sample cell 40, thereby providing a digital count corresponding to the volume of titrant dispensed by the burette. Since the count is proportional to the number of disc holes scanned, the initial position of the burette piston is unimportant, as long as there is sufficient titrant in the burette to carry out a complete titration.

Each output pulse from the photocell arrangement 72 is fed through an amplifier 74 to a Schmitt trigger 76. This trigger circuit generates a square wave output pulse which is fed through a gating circuit 78 to a count accumulator 80 which provides on a suitable display device 82 an indication of the total end point volume delivered by the burette in any one titration.

As is known in potentiometric titrations, a pair of electrodes 84 and 86 are immersed in the sample material 42 which is to be titrated. The structure and material of such electrodes is well known in the art, with the present device contemplating the use of a glass-calomel or similar electrode pair. A voltage potential will exist between the two spaced electrodes in accordance with the composition of the sample and its pH value, and this potential is applied by way of lines 88 and 90 to an amplifier 92. The amplified signal is appliPd by way of line 94 to a network 96 for electrically obtaining the first derivative thereof. As is known, a derivative network may take the form of an amplifier 98 and a parallel RC circuit consisting of resistor 100 and capacitor 102 connected across the amplifier. The output of network 96 will be the first derivative of the changing potential appearing across electrodes 84 and 86, and will take the form of curve 14 in FIG. 2. This first derivative voltage is applied by way of line 104 to the input of Schmitt trigger network 106. A threshold setting means 108, which may be a potentiometer or the like, is provided to establish the trigger point for network 106 so that when the value of the potential applied by way of line 104 reaches a specified value, the Schmitt trigger will produce an output on line 110; this output will remain as long as the first derivative of the electrode potential is above the threshold value. Thus, Schmitt trigger 106 produces an output through the inflection point of the titration, from points 28–30 on the curve 14 of FIG. 2.

The output signal from the Schmitt trigger is applied by way of line 110 to suitable control logic circuitry 112 (to be described) which, in turn, produces an output signal on line 114 which is fed by way of line 116 to the gate circuit 78. This output signal shifts the gate to a half-count mode whereby only alternate input pulses from Schmitt trigger 76 will be passed to the accumulator 80. In this manner, count pulses representing only one-half of the actual volume of titrant added between points 28 and 30 of the first derivative curve are fed to accumulator 80. The signal on line 114 is also fed to the motor control circuit 60 to insure that the drive motor operates at its slow speed during this critical time of the titration. At the end of the output signal from Schmitt trigger 106, the control logic 112 shuts down the drive motor 56 by way of line 118, thus ending the titration. The count value in the accumulator may then be indicated on display 82 to provide a direct reading of the volume of titrant added to obtain the end point of the titration.

Briefly, then, the system of FIG. 4 provides a digital count of the standard titrant added to the sample from the precision burette using, for example, a unit of one microliter per count. The sample potential is obtained from an appropriate electrode pair, and the first derivative is derived from this analogue value by electrical means. As the derivative voltage reaches a predetermined threshold level, a control circuit switches the counting path so that only one-half of the units counted are sent to the count storage, or accumulator. Thus, as the titration proceeds through the inflection area, only one-half of the additional titrant is recorded. Finally, as the titration curve again flattens out and the first derivative potential drops to approximately the predetermined threshold level, the titration is stopped and the count retained is that of the center of the inflection, i.e., the end point.

Figure 5:
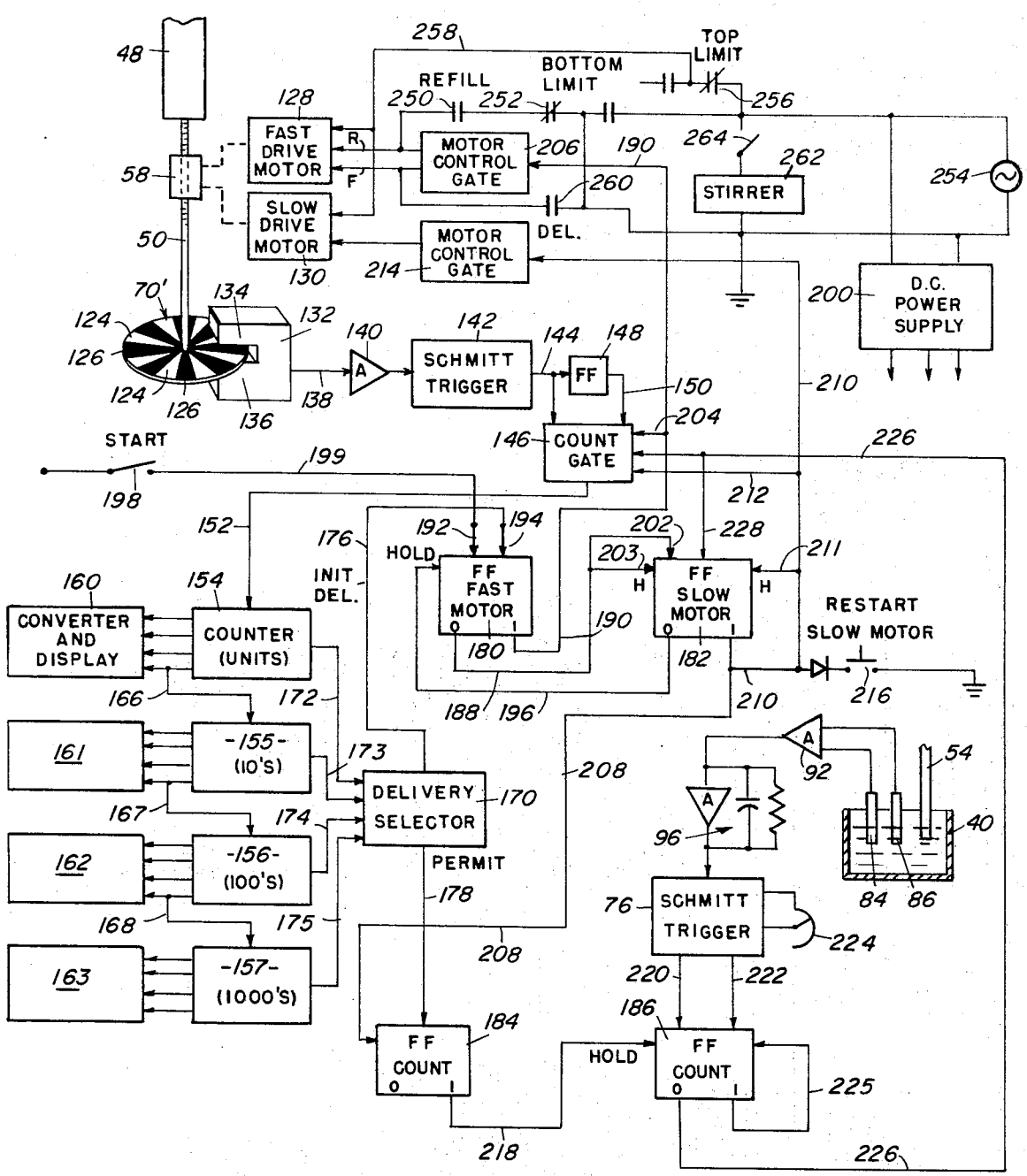
FIG. 5 is a more detailed illustration of the system of FIG. 4.

Turning now to a more detailed consideration of a system which is suitable for carrying out the method of the present invention, reference is made to FIG. 5. As illustrated in this figure, the micrometer screw 50 which drives the plunger of the precision burette 48 carries, as in the system of FIG. 4, a disc 70' which may be perforated as previously described, or which may carry a plurality of alternating transparent and opaque sections 124 and 126, respectively. In this embodiment, the micrometer screw is driven through a suitable drive gear 58 by means of either a high speed drive motor 128 or a low speed drive motor 130. Rotation of the micrometer screw to advance the plunger in the burette ejects the reagent fluid through feed tube 54 into the sample cell 40, as previously described. At the same time, rotation of the screw turns the disc 70' so that the alternate transparent and opaque sections pass between the upper and lower legs of a suitable sensing device 132. Sensor 132 may, for example, incorporate a light source mounted within an upper leg portion 134, and a photoelectric cell mounted within a lower leg portion 136. When an opaque section 126 of the disc is interposed between the light source and the photocell, no output is provided; however, when the disc rotates so that a transparent portion 124 is interposed between the upper and lower legs, the photocell produces an output signal which appears on line 138 for application to a suitable amplifier 140. It will be apparent that the opaque and transparent portions illustrated on disc 70' are merely diagrammatic, and that various other configurations may be used in ccordance with known methods of converting the analogue value of shaft rotation into a digital pulse. The sensor 132 is designed to produce an output pulse for each advance of the disc, and thus of the micrometer screw, through a predetermined angle. Since each such advance ejects a predetermined amount of reagent fluid from the burette, the output pulses on line 138 will provide a direct count of the volume of reagent supplied to the sample cell 40. A convenient value has been found to be one pulse output for each microliter of reagent dispensed.

The output signals amplified by amplifier 140 are fed to a Schmitt trigger 142, activating the trigger to produce a single output pulse of predetermined amplitude which is applied by way of line 144 to one input of a count gate 146. The pulse on line 144 is also applied to a flip-flop 148 which produces an output on line 150 for alternate input pulses, thereby feeding one-half of the pulses on line 144 to a second input of the count gate.

The count gate 146 is a logic circuit which serves to regulate the passage of counting pulses from the Schmitt trigger to its output line 152, the state of the logic determining whether each of the pulses on line 144 will produce a corresponding output pulse on line 152 or whether only the alternate input pulses from line 150 will appear on the output line. In the former state, the gate is in a full count mode, while in the latter state it is in a half-count mode.

The output pulses appearing on line 152 are applied to a suitable counter which may, for example, consist of a plurality of cascaded counters 154, 155, 156 and 157 which accumulate the pulses and produce outputs which correspond respectively to the units, tens, hundreds and thousands of pulses received from the count gate. The counters may be standard binary devices, each of which produces a binary output in accordance with the number of counts received. The outputs of counters 154–157 are applied to corresponding converter and display units 160, 161, 162 and 163 which serve to convert the digital outputs to conventional base-ten numbering which may then be displayed, as by illuminated lamps or the like, or may be printed or otherwise permanently recorded. It will be noted that a selected output of each counter is connected to the input of the following counter to effect the cascading arrangement. Thus, one output of counter 154 is connected by way of line 166 to the input of counter 155, one output of counter 155 is connected to the input of counter 156 by way of line 167 and one output of counter 156 is connected to the input of counter 157 by way of line 168, in a manner known in conventional counter networks.

A delivery selector network 170 is connected by way of lines 172–175 to selected stages in each of the counters 154–157 to form, in effect, a multiple position switch which is responsive to a predetermined count to produce an initial delivery pulse on line 176. A preselected number of counts after the initial delivery pulse appears, a permit signal is applied by the delivery selector to its output line 178. These two pulses are provided to facilitate the titration operation by speeding up the addition of titrant until the inflection point on the titration curve is approached and to prevent premature energization of the half-count mode. Since with most samples being tested, the approximate end point is known, it is possible to preselect a count (or volume of titrant) which will be near this inflection point. In the present device, the fast drive motor 128 is operated in the initial part of the titration to add a predetermined amount of titrant, and when this is done the initial delivery pulse turns off the fast drive motor and energizes the slow drive motor 130, reducing the speed at which titrant is added to the sample. When titrant is added at a fast rate, a large amount of electrical noise generally occurs in the sample cell, and it is difficult to measure with any accuracy the potential in the cell until the quantity of titrant so added has been thoroughly mixed with the sample. Therefore, the delivery selector 170 provides a delay time, during which titrant is added slowly and the sample is vigorously stirred so that the electrical noise quiets down, before accurate measurements of cell potential are to be made by the electrodes. This delay time may, for example, be approximately 200 counts at the slow rate, after which a permit signal is produced on line 178 which arms the system so that it will then respond to a threshold potential in the sample cell. This arrangement permits the titration to be carried out relatively quickly, while at the same time preventing the system from reacting to a noise signal that might exceed the threshold value and prematurely end the titration.

The logic circuitry which shifts the system from the fast drive motor to the slow drive motor and which allows it to respond to a threshold signal may take many forms, but in the present invention it comprises two pair of conventional flip-flop circuits interconnected as illustrated in FIG. 5. The flip-flops 180 and 182 provide the switching logic for controlling drive motors 128 and 130, while flip-flops 184 and 186 provide the switching logic for the threshold sensing mechanism.

Flip-flop 180 is of conventional type, having two output lines 188 and 190, one of which will have a "0" output and the other of which will have a "1", or positive voltage output. In its normal, or reset, condition, line 188 carries the 0 output and line 190 carries the 1 output. The flip-flop has a pair of inputs 192 and 194 which serve to shift the flip-flop from one state to the other; thus, the presence of a signal on input 192 serves to flip, or set the unit, shifting it from its normal state to a set state where line 188 carries a 1 output and line 190 carries a 0 output. The flip-flop stays in this condition until a signal is received on input 194 which flops the circuit back to its reset, or normal state. A hold input 196 is also provided which serves to inhibit the flip-flop and prevent it from changing state.

A start switch 198, which is provided for initiating a titration, is connected to the set input 192 of flip-flop 180 by way of line 199. This switch may be automatically or manually operated, depending upon the type of system in which the present invention is incorporated, and is supplied by a suitable operating voltage from a DC power supply such as that illustrated at 200.

Output line 188 of flip-flop 180 is connected to a set input 202 of flip-flop 182, which is similar to flip-flop 180 and of conventional construction. Output line 190 leads from flip-flop 180 to the hold input 203 of flip-flop 182 to inhibit operation of flip-flop 182 as long as flip-flop 180 is in the reset, or normal condition. Line 190 also leads to an input 204 of the count gate 146 and to the input of a fast motor control gate 206 which serves to control the operation of the drive motor 128.

Flip-flop 182 has a first output which, in its normal condition, carries a 0 signal, and which is connected to line 196 leading to the inhibit input of flip-flop 180. The second output from flip-flop 182, which normally carries a 1 signal, is connected by way of line 208 to the hold input of the count flip-flop 184, inhibiting the setting of that flip-flop as long as a 1 appears on line 208. Line 208 is also connected by way of line 210 to an input 212 of count gate 146 and to the input of a slow motor control gate 214. This latter gate responds to a 0 signal on line 210 to energize the slow motor 130; thus the setting of flip-flop 182 turns on the slow motor and releases flip-flop 184. Also connected to line 210 is a restart switch 216 which permits the slow drive motor to be manually operated, if desired.

The set input of the count flip-flop 184 is connected to the permit line 178 leading from th delivery selector 170, so that flip-flop 184 will be shifted to its set condition upon receipt of a signal from selector 170 if that signal occurs after flip-flop 182 has been set, and the hold signal this removed from line 208. The 1 output of flip-flop 184 is connected by way of line 218 to the hold input of the count flip-flop 186, thereby inhibiting flip-flop 186 until flip-flop 184 is set by the permit signal.

The set and reset inputs to flip-flop 186 are connected to output lines 220 and 222, respecctively, of the threshold signal Schmitt trigger 76 described with respect to FIG. 4. As has been explained, the electrodes 84 and 86, which are immersed in the sample contained in cell 40, produce a potential which is proportional to the pH value of the sample. This potential is amplified in amplifier 92 and differentiated in the derivative network 96 to produce an electrical signal similar to that illustrated by the curve 14 of FIG. 2 during the course of the titration. When the output of the differential network 96 reaches a predetermined level, the Schmitt trigger 76 is fired to produce a square wave signal of predetermined amplitude and of a length dependent upon the length of time that the derivative value remains above the threshold level. A potentiometer 224 or the like may be used to preset the threshold level.

The leading edge of a square wave output from the Schmitt trigger is applied as a positive-going set signal by way of line 220 to the flip-flop 186, causing it to shift from its normal state to produce a 0 output on output line 225 and a 1 output signal on output line 226. This positive going voltage on line 226 is applied to the final input of the count gate 146 to shift the gate to its half-count mode, and is applied to the reset input 228 of flip-flop 182.

Figure 6:
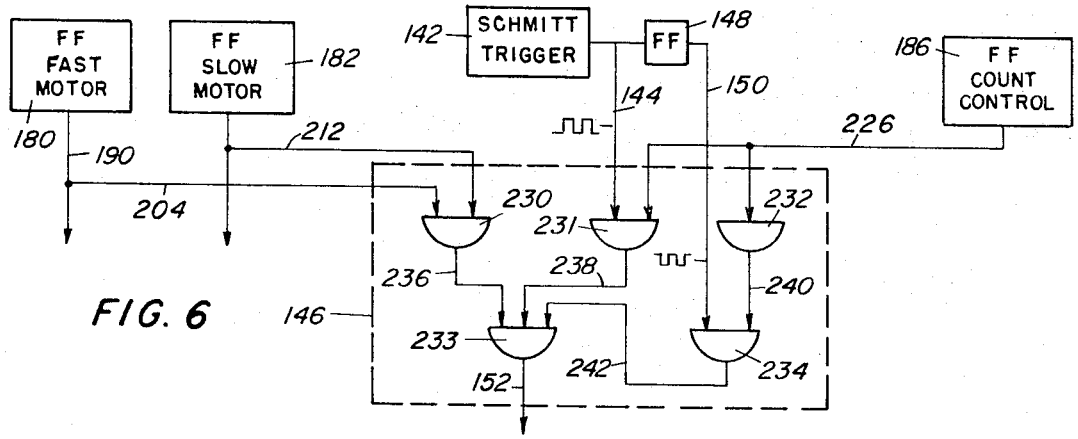
FIG. 6 is a circuit diagram of the count gate of the system of FIG. 5.

Referring now briefly to FIG. 6, the count gate 146 is illustrated in further detail as consisting of an array of five OR logic circuits 230, 231, 232, 233 and 234. Each of these OR gates is responsive to the presence of a 1 signal at any one of its inputs to produce a 0 output signal. Thus, if a 1 appears on either line 204 or 212, which are connected to the inputs of OR gate 230, the output of this gate on line 236 will be a O. On the other hand, O inputs on lines 204 and 212 will result in a 1 output on line 236. In similar manner, 0 signals on input lines 144 and 226 will result in OR gate 231 producing a 1 signal on its output line 238 and similarly results in a 1 signal on the output line 240 of OR gate 232. Again, if a 0 signal exists on both lines 150 and 240 leading to the OR gate 234, a 1 signal will appear on its output line 242. Lines 236, 238 and 242 provide the inputs to the OR gate 233 and the presence of a 1 signal on any one of these lines results in a 0 signal on output line 152.

Figure 7:
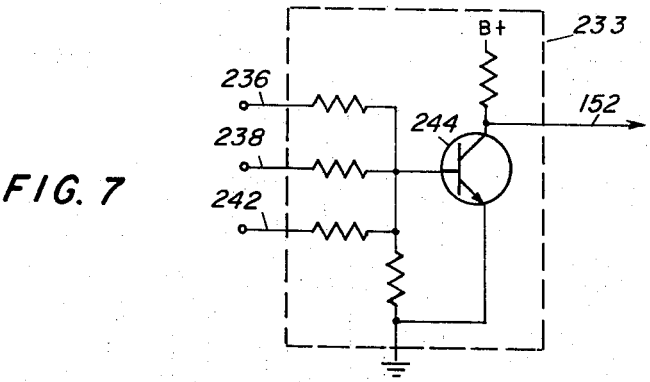
FIG. 7 is a circuit diagram of a typical OR gate usable in the circuit of FIG. 6.

FIG. 7 illustrates a typical OR gate such as the gate 233 wherein the input lines 236, 238 and 242 are connected to the base of a gating transistor 244. When no input appears on any of lines 236, 238 or 240, the transistor is non-conductive and the B+ voltage appears on output line 152. However, if an input signal is applied to any of the three input lines, transistor 244 becomes conductive and line 152 goes to ground potential, thereby producing a 0 on the output line.

The operation of a typical titration system may now be described with reference to FIGS. 5 and 6. Initially, the count gate 146 and the counters 154–157 are reset to 0 and the flip-flops 180, 182, 184 and 186 are reset to their normal, or rest, condition wherein their output lines carry 0 and 1 signals, as indicated in the drawings. A sample material is placed in cup 40, and the delivery selector 170 is set to add a predetermined volume of titrant to the sample under control of the high speed motor. The start button 198 is then depressed, producing a pulse at input 192 of flip-flop 180, thereby reversing the outputs of this unit. A 0 signal now appears on line 190, which is fed to the inhibit input of flip-flop 182, to one of the inputs of OR gate 230 (FIG. 6), and to the motor control gate 206. The 0 input at the gate 206 energizes the fast drive motor 128 which begins to rotate micrometer screw 50 and disc 70' by means of gear mechanism 58, dispensing titrant from burette 48 at a predetermined volume per unit of rotation.

The rotation of disc 70' produces a series of output pulses from the photoelectric sensor 132, each pulse corresponding to a unit of titrant dispensed. These pulses are applied by way of Schmitt trigger 142 and line 144 to one of the inputs of OR gate 231 (FIG. 6), producing at that input a square wave input alternating between the 0 and 1 level. The signal on line 144 is also applied through flip-flop 148 where alternate input signals set and reset it. One of the outputs of flip-flop 148 is connected by way of line 150 to one of the inputs of OR gate 234, producing at this input a square wave signal alternating between the 0 and 1 level at one-half the frequency of the count signal on line 144. The Schmitt trigger 142 continues to produce square wave output pulses as long as the disc 70' is rotated by either the fast or the slow drive motors.

The positive, or 1 signal, applied to line 188 at the start of the titration is applied to the set input 200 of flip-flop 182. However, this flip-flop does not change state because of the hold signal applied by the 0 on line 190. This hold signal effectively makes the set input responsive to the trailing edge of a positive pulse; i.e., when the signal on line 188 returns to 0 flip-flop 182 will shift.

Under this condition, with the fast motor operating to drive the burette, the count gate 146 operates to provide an output pulse on line 152 for each input pulse that appears on line 144. Referring now to FIG. 6, OR gate 230 is blocked by a positive signal appearing on line 212 from flip-flop 182. Since flip-flop 186 is still in its initial condition, line 226 carries a 0 signal and accordingly OR gate 232 produces a 1 on line 240, blocking OR gate 234. The 0 signal on line 226 does not block OR gate 231, and thus the alternating input count signals on line 144 will produce alternating 1 and 0 signals on its output line 238. Since OR gate 234 is blocked, a 0 appears on line 242; similarly, a 0 appears on line 236 and neither or these lines will block OR gate 233. Thus, the alternating pulse on line 238 corresponding to the full count from Schmitt trigger 142 will appear on the output line 152. This full count pulse is applied to counter 154 (FIG. 5) and in known manner counters 154–157 accumulate a count corresponding to the number of pulses received.

When a preselected count is reached, the delivery selector switch passes that count to the initial delivery line 176 which pulses the input 194 of the fast motor flip-flop 180, returning it to its initial condition. This returns a 1 signal to line 190, which removes the hold from flip-flop 182 and allows it to shift; the return to 0 of the signal on line 188 accomplishes this shift. The signal on line 190 is applied to the count gate 146, blocking OR gate 230, and at the same time disables the motor control gate 206 to turn off the fast drive motor. When flip-flop 182 shifts, it places a 1 signal on line 196 which then holds the fast motor flip-flop 180 in its initial condition, and prevents the fast motor 128 from being energized. A 0 signal now appears on line 208 which is fed by way of line 210 to a hold input 211 which prevents the reset input 228 on flip-flop 182 from responding to the leading edge of a positive input pulse. The signal on line 210 is also applied by way of line 212 to the OR gate 230 and to the input of the motor control gate 214, thereby energizing the slow drive motor. Under this condition, the count gate continues to produce full count pulses on its output line 152, and the counter continues to operate as before.

After a delay time of about 200 counts, which provides sufficient time for the large volume of titrant added to the sample to be thoroughly mixed and the resultant electrical noise to have quieted down, the delivery selector produces a signal on the permit line 178 which is applied to the set input of flip-flop 184. This flip-flop is inhibited by the positive signal that normally exists on line 208, but since that signal was removed when the slow motor was turned on, the permit signal shifts flip-flop 184. This places a 0 signal on line 218, and releases the flip-flop 186 so that it is capable of responding to a threshold signal from Schmitt trigger 76.

Count gate 146 is unaffected by the permit signal on line 178, and the full count from Schmitt trigger 142 remains on output line 152. The addition of titrant to the sample material continues, with the burette being driven by the slow drive motor 130, and the voltage across electrodes 84 and 86 approaches the inflection point on the curve of FIG. 1 while the first derivative thereof follows curve 14 of FIG. 2 and approaches the threshold point 28, which has been established by the setting of potentiometer 224. When the threshold point is reached, Schmitt trigger 76 fires and produces a positive going pulse on line 220 which shifts flip-flop 186. A 0 signal now appears on line 225 and is fed to a hold input on flip-flop 186, keeping the flip-flop in this condition until the trailing, or negative going, edge of the threshold pulse appears on line 222. The signal now on output line 226 is fed to count gate 146 and to the reset input 228 of flip-flop 182. However, flip-flop 182 does not shift at this time because of the hold signal applied to line 211, and the slow motor continues to run.

As will be seen from FIG. 6, the 1 signal applied to line 226 blocks OR gate 232, shifting its output to 0. At the same time, the 1 signal on line 226 is applied to OR gate 231 and blocks that gate also, preventing the passage of full count signals from line 144 to line 152. With a 0 now appearing on line 240, the output of OR gate 234 will follow the half-count signal appearing on line 150, thereby producing a half-count on line 242. With gates 230 and 231 blocked, a 0 signal results on each of lines 236 and 238, and OR gate 233 will follow the half-count pulses on line 242, thereby feeding this half-count signal to line 152. As before, the counters 154–157 accumulate the pulses fed to them by way of line 152.

The half--count operation continues through the end point of the titration (FIG. 2) until the threshold point 30 is again reached, at which time Schmitt trigger 76 turns off. This produces a pulse on line 222 which corresponds to the trailing edge of the threshold pulse, and which returns flip-flop 186 to its original condition, placing a 0 signal on line 226. This return to 0 appears as a negative going signal on line 228 which resets flip-flop 182 and turns off the slow motor 130. The 0 signal on line 226 is applied to OR gate 232 which then produces a 1 on its output 240 to block gate 234 and prevent any half-count pulses on line 150 from passing to the output line 152. However, it is noted that when both motors are off, disc 70' will stop rotating, and no pulses normally will appear on line 144 or on line 150. With a 0 on line 226 and a 0 on line 144, OR gate 231 produces a 1 on line 238 and blocks OR gate 233, further preventing output signals from appearing on line 152.

The total count now appearing in the counters 154–157 may be converted to decimal form and displayed by converter and display units 160–163. As has been explained, the count accumulated and displayed in the manner described above will represent the total volume of titrant added to the sample up to the end point of the titration. This is because the full count has been recorded up to threshold point 28 on the curve 14, and one-half of the volume added between points 28 and 30 were added to that first total. Because of the symmetry of curve 14 above the threshold point, one-half of the count between points 28 and 30 will give the end point 16 with a high degree of accuracy.

The fast drive motor 128 may also be used to fill burette 48 from a suitable supply, and to this end the motor is provided with means for operating it in a reverse direction. This means includes a manually operable refill switch 250 which is in series with a normally closed bottom limit switch 252 responsive to the position of the plunger in the burette. Alternating current power from a source 254 is applied to the drive motors 128 and 130 by way of the normally closed top limit switch contact 256 and a line 258 whereby operation of either of the motor control gates 206 or 214 allows the corresponding motor to run in its forward direction, until the burette plunger reaches its top limit, indicating that the supply of titrant has been depleted. At this time, the top limit switch 256 opens and prevents further operation of the motor until the burette is refilled. A manual deliver switch 260 is provided to allow the fast drive motor to be operated in a forward direction, if desired. A magnetic stirrer motor 262 is connected across source 254 by means of an on/off switch 264 which may be manually or automatically operated.

The basic system described with respect to FIG. 5 can be refined in many ways, and additional features may be added to permit the use of this system in a continuing and automatic monitoring of an industrial process wherein the results of a series of titrations are used for quality control purposes. In such a system, the use of the optional fast drive motor feature described herein is of particular use, for it permits a major portion of the titrant to be added initially to each sample, when it is known that the samples will vary only slightly in characteristics and thus speeds up the titration procedure. As described, this rapid addition is followed by a brief settling to permit proper mixing and allow accurate measurements; it will be apparent that the slow motor may be used throughout the procedure, if desired.

A practical machine for carrying out such continuous analysis has been reduced to practice and has been found to provide a highly significant improvement in quality control. With the developed machine, it now becomes possible to obtain the result of a titration of a sample drawn from a production line every 6 minutes, for example, automatically and without the need for skilled laboratory personnel. This compares with the former method of such monitoring wherein at least three trained technicians were required to manually titrate samples taken periodically from the production material. With three highly trained persons, it was only possible to obtain results from 12 or 15 titrations during an 8-hour shift, and no results were obtained during the remaining 16 hours of a day's production run. On the other hand, the present machine may be operated on a 24-hour-per-day basis, with results that are virtually as accurate as those obtained in the manual methods previously used while eliminating the need for skilled operators. With 24-hour monitoring of an industrial process through the use of this machine, a far superior control can be maintained over production processes.

An automatic system of this type may, for example, be constructed with a large turntable adapted to receive a large number of sample cups spaced around its circumference. To provide additional testing stations, it may be desired to provide two circumferential rows so that by duplicating the burette, motor controls, counters and the like, two titrations can be carried on at one time. Preferably, the system would include indexing means for rotating the table periodically to bring the sample cups successively into position below the burette where the titration takes place. In such an automatic system, the electrodes placed in the sample cup would have to be movable, and for this purpose may be located on a suitable elevator. By properly timing the duration of each titrating step, and by providing a suitable number of sample receptacles on the turntable, a system can be operated automatically with only a minimal amount of attention. Thus, an attendant would take a sample of the material to be tested and place it in a cup together with the solvents necessary to the performance of the titration. The sample cup may then be placed in an appropriate position on the turntable so that as the table indexes, the sample will be carried thereon for a time sufficiently long to enable the solvent and the sample to reach a stable condition (i.e., the sample may be carried by the turntable for an hour or more before the titration actually takes place). When a cup is indexed under the burette, the electrodes are lowered into it and a magnetic stirrer begins operation, rotating a stirring bar within the cup. The titration then proceeds as described herein above, and upon its completion the cup is indexed away from the titrating station. Automatic means may be provided to lift the cup out of the turntable and empty it, with the stirring bar being recovered for future reuse.

Figure 8A:
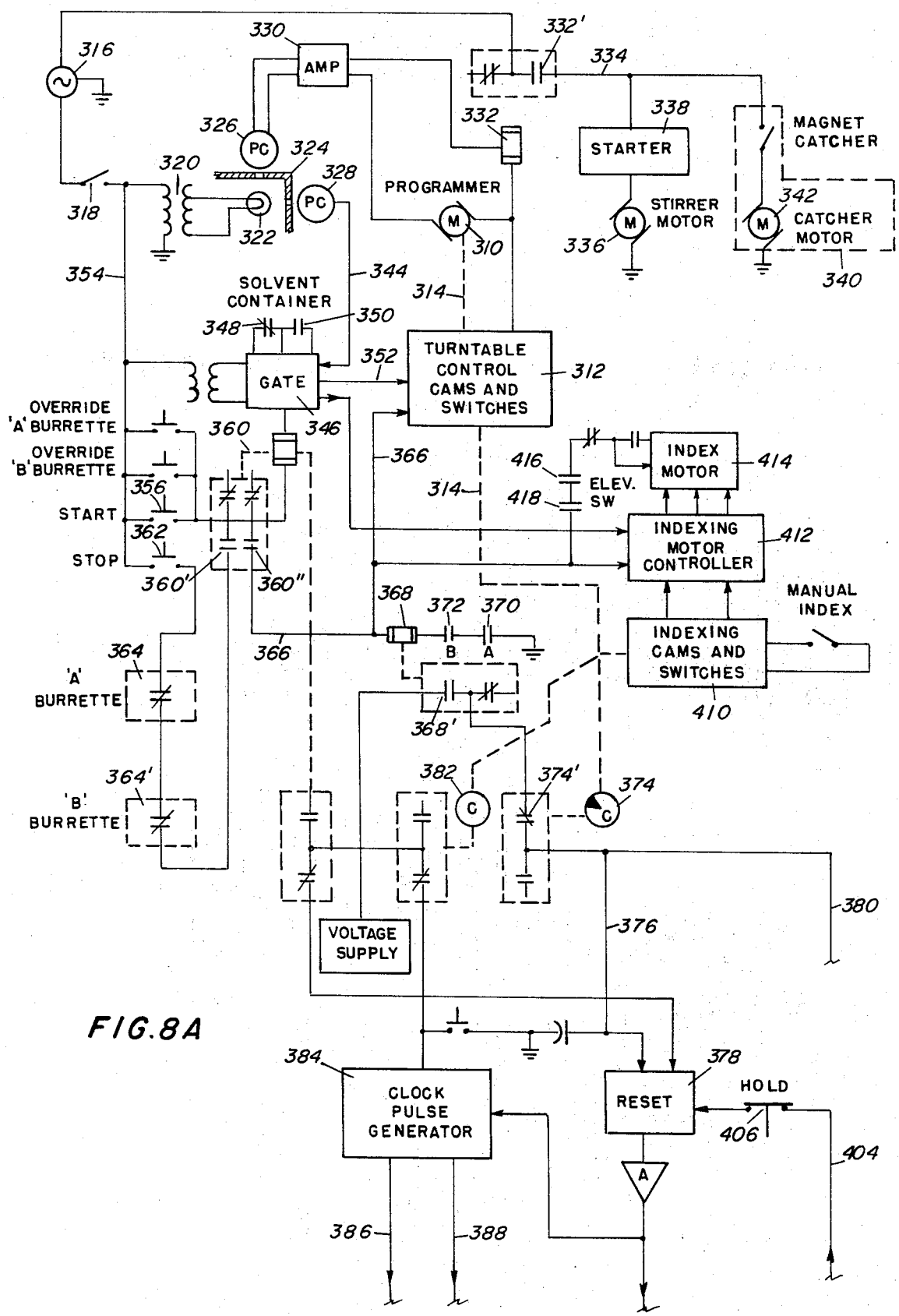
FIGS. 8A and 8B comprise a diagrammatic illustration of an expanded automatic titrating system using the method of the present invention.
Figure 8B:
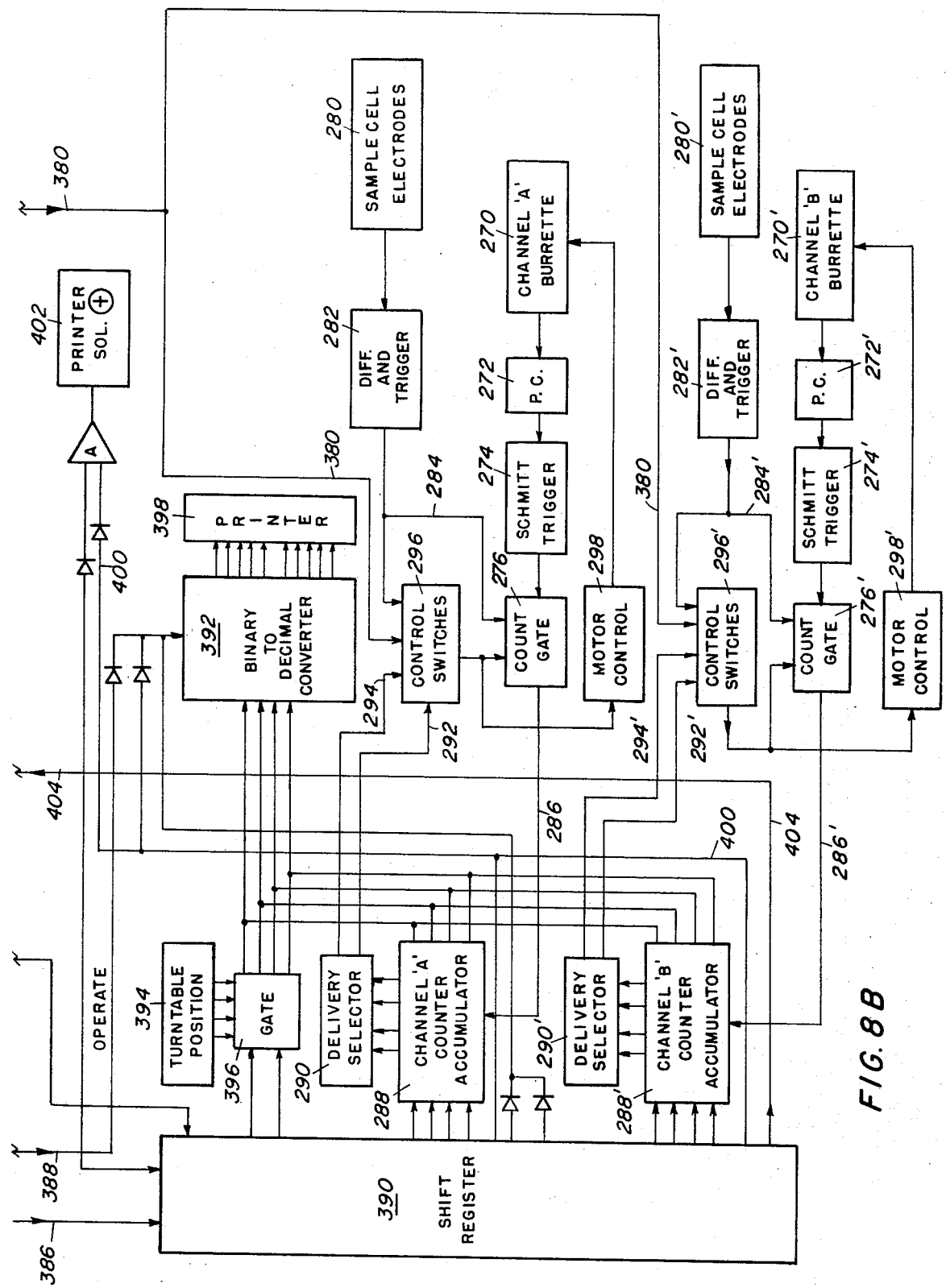

A system for operating a turntable device of the foregoing type is generally illustrated in FIG. 8. Although this illustration is diagrammatic, it will be seen from this how the circuitry of FIG. 5 may be adapted to more complex automatic titration apparatus. As shown in FIG. 8B, two burettes 270 and 271 are illustrated, the first being for sample cups carried on a first row around the periphery of the turntable and the other being for a second row of samples. As has been described, the output of the burette 270 is monitored by a sensor 272, the output of which is fed through a Schmitt trigger 274 to produce count pulses corresponding to the volume of titrant dispensed. These pulses are fed to a count gate 276. The electrodes 280 in the sample cell being titrated produce an output which is differentiated, with the differential voltage operating a trigger circuit 282 at a predetermined threshold value. The output of the trigger is fed to the count gate 276 by way of line 284. As before, a signal on line 284 shifts the counting rate from a full count to a half-count when the threshold point of the titration is reached. The output of the count gate is fed by way of line 286 to a channel A counter, or accumulator, 288 where the count corresponding to the volume of titrant dispensed is stored for display purposes. As before, a delivery selector switch 290 is connected to the counter to produce an output on line 292 when the initial high speed delivery has been completed, in those installations where such an initial delivery is appropriate, and to provide on line 294 a permit signal which arms the system for response to the threshold signal from trigger 282. A control switch network 296, which consists of the flip-flop networks illustrated in FIG. 5, responds to the various control signals to operate the motor-driven burette at the appropriate speed, by way of motor control network 298, and to regulate the operation of count gate 276. The channel B burette 270' operates in similar manner, and the corresponding elements of channels A and B are similarly numbered, with the channel B elements being primed.

The operation of the turntable, electrode positioning elevators, stirrers and the like is controlled by a programmer which may, for example, include a series of cam follower switches operated by cams mounted on the shaft of a suitable drive motor. Such a programmer is illustrated in FIG. 8A as comprising a programmer motor 310 and a plurality of turntable control cams and switches 312 driven thereby through a mechanical drive shaft 314. The programmer motor operates as a clock, and regulates the overall operation of the automatic titrator.

Alternating current is supplied to the system from a source 316 through a master on/off switch 318. Power is applied by way of transformer 320 to an indexing lamp 322 which is located adjacent the turntable 322. An aperture is provided at each sample station around the circumference of the turntable so that when the table is properly positioned for a titration, light from lamp 322 will pass through the corresponding apertures and fall on photocell devices 326 and 328. The output from photocell 326 is fed through amplifier 330 to the coil 332 of a stirrer relay, thereby closing its normally open contact 332' and applying power from source 316 to a stirrer motor 334. This motor may be provided with a starter 336, and when activated serves to rotate a magnetic stirrer bar located within the sample cup positioned at the titrating station to stir the sample. Also connected to line 334 is a magnet catcher 340, including a catcher motor 342 which is used to recover the magnetic stirrer bar when the titration is over and the sample is discarded.

The output of photocell device 328 is fed by way of line 344 to a gate circuit 346 to provide an indication when the turntable is properly positioned so that the titration can go forward. A pair of solvent container switch contacts 348 and 350 are responsive to the fluid level in the container which dispenses solvents into the sample containers before they reach the titration station. When the container is empty, the switches reverse condition and halt the operation of the device. The gate also provides an input to the turntable control network 312 when the turntable is properly positioned to regulate the cup and stirrer removal equipment and the electrode raising and lowering elevators.

The main power supply to the system is provided by way of line 354 and start button 356 which is manually closed to provide current to the coil of a main power relay 360. Upon energization of the coil of relay 360, its normally open contact 360' is closed so that the main current path is from line 354 through the normally closed stop button 362, the normally closed "A" burette switch 364 and the normally closed "B" burette switch 364' so that contact 360' acts as a self-holding contact for the relay. Contact 360'' is also closed by energization of relay 360 so that power is supplied to the turntable control cams and switches 312 by way of line 366. Line 366 also applies current to a titration relay 368 which can be energized only when the titration station switches 370 and 372 are closed by the presence of sample cups in the turntable at the titration station. If the cups are in position, relay 368 is energized to shift its contacts 368' to set up the system for the titration operation.

During the initial stages of operation, the system is held in its reset condition so that the counting circuits and the like are not affected by electrical transients and noise. The programmer motor 310 operates through cams in the control array 312 to refill the burettes with titrant by operating their respective fast drive motors in a reverse direction, as has been explained. Upon completion of this, the refill switch opens and the cams operate the electrode elevators to lower the electrodes and titration tubes into the sample cell which is at the titration station and which is being stirred by motor 336. Continued rotation of programmer 310 then causes cam 374 to shift its corresponding contacts 374', applying a positive going pulse through line 376 to a reset circuit 378 to remove the reset clamp and through line 380 to the control flip-flops 296 and 296' to start the titration. The photoelectric counters, reset to 0, begin to count microliters of titrant as they are dispensed to each sample, and when a predetermined count is reached the corresponding flip-flops and control networks 296 and 296' are reset to change the appropriate burettes from rapid to slow delivery. An additional 200 counts later, the delivery selectors 290 and 290' again activate the control switches 296 and 296' to permit the first derivative circuits in each channel to become active. As the pH value of each sample approaches its maximum rate of change, indicating that its end point is approaching, the increasing first derivative voltage reaches the threshold point at which it shifts the counting rate to one-half the number of counts detected by the corresponding sensors 272 or 272'. Finally, as the pH change in the sample decreases, the decrease in the first derivative again operates on the control switches to stop the count at the threshold value and to stop the burette motor. This sequence and counting action occurs independently for the two channels A and B. When both titrations have been completed, and the counts showing the amount of titer added to the sample to reach the end point have been stored in the corresponding accumulators, the program cycle resumes. The programmer motor may be stopped during the titration and then restarted in response to the operation of the flip-flop which shuts off the burette motor, for example, or the cycle may be established in the programmer so that the motor will continue to run, with the next step in the cycle occurring a predetermined length of time after the start of titration. In either event, the next step in the cycle is for the programmer motor 310 to drive printout cam 382 to shift its corresponding contacts and thereby start a clock pulse generator 384. The clock has three phases, the first being a rest state which is its reset condition, and the other two being trigger and operate states which produce alternate output signals. Thus, a train of trigger pulses appear on output line 386 and a train of alternate operate pulses appear on output line 388. The trigger pulses are applied to a conventional shift register 390 which steps one position for each trigger pulse received, with each position producing a corresponding output signal which is used to gate information to a binary to decimal converter network 392. This converter produces an output which is a decimal digit 0–9 corresponding to the binary input that it receives.

A plurality of turntable position switches, which may be microswitches actuated by coded pins located at each station of the turntable, are indicated generally at 394. The particular combination of microswitches closed by these coded pins controls the energization of selected gates in the gate network 396, and the first two outputs of the shift register transfer this information to the converter 392. These first two pulses from the shift register each transfer one digit of the turntable position to the converter, and the intervening operate pulse on line 388 causes the converter to feed that data to a printer 398. This printer may be a standard, heavy-duty adding machine wherein the 0–9 digit keys are mechanically operated by corresponding solenoids, the proper solenoid being selected by the output from converter 392. After the two digits corresponding to turntable position have been entered in the printer, the shift register then operates to transfer the accumulated count from the channel A counter 288 to the converter 392. The counter is arranged so that each pulse from the shift register transfers in binary form one of the decimal digits making up the count. Thus, the third pulse from the shift register transfers the units count in the accumulator 288, the fourth pulse transfers the tens, the fifth pulse transfers the hundreds and the sixth pulse transfers the thousands digit to the converter where the alternating operate pulses on line 388 again transfer these numbers to the printer. The next output pulse from the shift register operates the printer to provide a printed readout of the turntable position and the accumulated count.

After two idle counts from the shift register, which are provided to allow time for the printer to complete its operation, the channel B accumulator 288' is similarly read out and printed, the print signal being applied by way of line 400 to a printer solenoid 402. The final output from the shift register 390 is applied by way of line 404 to the reset circuit 378 which resets all of the circuits to the initial condition, ready for the next titration. If desired, a hold button 406 may be provided to interrupt the reset line 404 so that the system will remain in its current condition, thereby permitting an interim printout by operation of a manual print button.

Upon completion of the printout and resetting, the programmer motor 310 drives the indexing cams and switches indicated generally at 410, thus activating an indexing motor controller 412 to energize an index motor 414. At the same time, the motor operates the elevator cam to raise the electrodes in both sample cups. When this operation has been completed, the elevator switches 416 and 418 are closed, allowing the index motor to be energized to rotate the turntable to the next position. The program motor then operates the cup emptying equipment to discard the used sample, and when this operation has been completed the system is ready to begin another cycle.

Numerous other features may be provided in a system of this type, as is known in the art of automatic titrators. Thus, signal lights may be provided to give a continuous indication of the operational state of the system, and various manually operated switches may be provided to override the automatic systems described herein. Further, safety relays responsive to undervoltage conditions and the like together with suitable warning lights may be provided, but all of these features are well known and their application to a system utilizing the present invention will be apparent to those of skill in the art.

Figure 9:
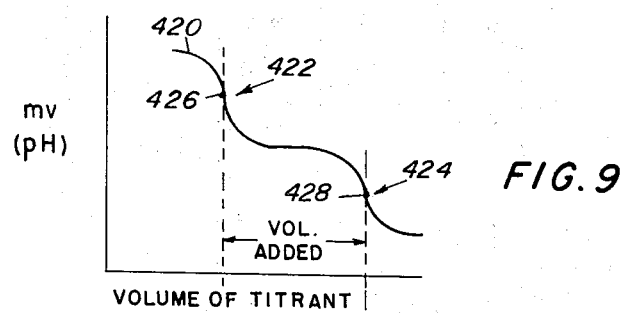
FIGS. 9 and 10 disclose a typical double-break potentiometric curve and the first derivative thereof, respectively.

Although the present invention has been described with respect to a system for determining the end point of a titration wherein the potential curve has a single break, the second application of this technique occurs in the case where there are two inflection points in the pH-volume of titrant curve. In such cases, it is required to determine the volume of titrant added between the two inflection points. Such a curve is illustrated in FIG. 9 at 420, where first and second inflection points 422 and 424 are generally indicated. As before, the points of maximum inflection 426 and 428 are of interest, and it is required to determine the volume of titrant added between these two points.

Figure 10:
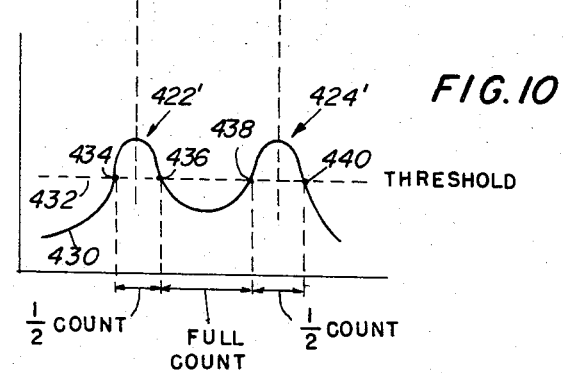

FIG. 10 illustrates the first derivative of the curve of FIG. 9, and illustrates that two peaks are generated by this curve, one occurring at each inflection point, as at 422' and 424'. The first derivative curve 430 has again been found to be substantially symmetrical above a threshold value indicated by line 432, and this threshold value can be again used to regulate a counting circuit so that the desired volume is obtained. To provide the desired volume reading, additional or modified logic circuits are required so that the systems of FIGS. 5 or 8 will operate in the following manner. As the first derivative curve 430 increases toward the threshold value, no count is accumulated, for this volume of titrant is not of interest. However, at the threshold value at point 434 in FIG. 10, the count gate is activated to produce a half-count, as has previously been described. This half-count continues until the curve falls below the threshold value, at point 436. However, instead of shutting down the system at this point, the count gate is shifted to the full count mode and a full count is accumulated until the curve 430 increases above the threshold value a second time, at point 438. Again, the system shifts to a half-count mode until at point 440 the first derivative falls below the threshold value, at which time the system is shut down. The total count accumulated between points 434 and 440 then represents the volume of titrant added between the points of maximum inflection at 426 and 428. For this type of measurement, only the slow drive motor is used. Thus, the start button would be utilized to operate the slow motor, rather than the fast motor, and the delivery selector would be energized to continuously provide a permit signal, thereby arming the flip-flop which is responsive to the first derivative signal. In this manner, the circuit is responsive to the first output of a derivative circuit which occurs when the threshold is reached, but the motor is not turned off when the signal returns to that threshold level. Instead, the output of the derivative circuit merely returns the count gate to its full count until the threshold is again reached. By a suitable arrangement of flip-flops, or like switching networks, the slow motor control is made responsive to the second decrease of the first derivative output to the threshold level, and at that time the motor is turned off and the count is terminated. If desired, this may be modified by energizing the fast motor during the full count, but where the overall time period for the titration is not too great, the use of the fast motor drive is not necessary.

A potentiometric titrator has been built and operated in accordance with the herein disclosed half-count concept, and has been found satisfactorily to meet the requirements of industry and of the American Society of Testing Material for its industrial monitoring procedures. Thus, for example, the manufacture of nylon polymer has been monitored, with test samples taken from the product line for testing in the automatic titrator described with respect to FIG. 8. In one such test, each sample consisted of approximately two and one-half grams of nylon polymer which was placed in a sample cell, or cup, and the sample was titrated to determine the amine end group of the nylon polymer. A magnetic stirring bar was placed in the cup and the cup placed in the turntable, the remainder of the test was fully automatic, so that skilled testing personnel were not required.

When the turntable was indexed to the appropriate station, solvent was automatically metered into the cup containing the nylon polymer, and approximately 60 ml. of a menol solvent was added. The sample was dissolved and stirred as the turntable continued to be periodically indexed so that titration of samples in preceding cups could be carried out. The sample dissolved in approximately 1-½ hours, but the number of positions and the indexing rate of the turntable were so arranged that the given sample cup was not carried into position for titration for approximately 1-½ hours after the solvent had been added. When the cup moved into the titrating position, the electrodes and the titrant feed tube were lowered into the cell and the stirring motor was energized.

The sample was titrated with an alcoholic solution of perchloric acid, the fast motor operating to add titrant at a high rate of speed until 1,200 microliters of titrant had been added; thereafter, the slow motor operated to add 200 $\mu$l of titrant before the permit signal armed the half-count circuit. The full count then continued while 425 microliters were added to the solution, at which time the threshold point was reached and the half-count circuit was energized. The half-count continued until the threshold was again reached, at which time the titration stopped and the total count of 1,878 microliters was printed. Results calculated from this analysis showed 57.6 meq of amine end per kg. The electrodes were then raised, the turntable indexed and the spent solution discarded together with the sample cup, the magnetic stirrer being retained for further use. A second sample was taken from the same production run and titrated manually, with a graphical analysis being made of the end point. The result of this test showed 57.4 meq. of amine end per kg.

A second example of the use of the present machine was the determination of the combined acidic content of cellulose acetate in accordance with ASTM methods. In this example, a sample of about two grams of cellulose acetate were placed in a sample cup, and the cup was placed on the turntable of the subject titrator. At the solvent station, 100 milliliters of acetone solvent were added and the sample was allowed to dissolve. Thereafter, 68 milliliters of 0.5 normal sodium hydroxide (aqueous solution) was added, thereby forming regenerated cellulose and permitting suponification of the actual end group.

After a delay period of 30 minutes, the sample cup was indexed to a diluting station, where 100 ml. of hot, demineralized water, at about 180°F, was metered into the sample cup. After stirring, the sample was titrated in accordance with the above-described half-count method, using a standard hydrochloric acid solution. The total count was then printed out, and the sample discarded. The printout showed a total volume of 22.35 ml of titrant added to the end point, as compared to a value of 22.42 ml. obtained through the manual graphical method described above.

As an illustration of the use of the present method in a double end point titration, a test was run to determine the carboxyl end group level of a nylon polymer sample. The selected sample, which was of a convenient and practical size in accordance with normal techniques, was placed in solution by the addition of benzyl alcohol, in accordance with the prescribed method. The sample so prepared was placed in a sample cup on the turntable and 10 ml of methanolic perchloric acid was added to bind the amine end groups. The amount of acid so added was in excess of that required for the binding, thereby providing a solution having an excess of perchloric acid, plus the dissolved polymer, plus the carboxyl end groups, so that the carboxyl groups could be titrated.

The sample was indexed to the titration station, and was titrated with an alcoholic solution hydroxide. The titrant was added under the control of the slow motor with the differentiating circuit armed by the permit signal to be responsive to the threshold of the first derivative signal. No measurement of the titrant volume was recorded, stored or displaced until the start of the half-count at the threshold of the first potentiometric break. This break was that of the excess perchloric acid, and the half-count mode continued through the end point of this break. The first derivative returned to the threshold level, after 35$\mu$ l of titrant had been added and the system shifted to a full count. The slow motor continued to operate to add titrant until the second potentiometric break was reached. At the threshold value of the first derivative at the second break, which is that of the carboxyl end groups, the system shifted back to the half-count, 805$\mu$l. having been added to this time. The carboxyl end groups were then titrated through their end point and when the first derivative curve again turned to the threshold value, the motor was shut down and the titration ended. The total count of 897$\mu$l. was then printed out, giving the total amount of titer required to neutralize, the carboxyl end groups; that is, the amount of titrant added between the end points of the two potentiometric breaks. This result was computed to give a value of 82.6 meq/kg. This value compared with a similar calculation made of a similar sample by manual and graphical methods, which showed 82.1 meq/kg.

From the foregoing, it will be seen that the present invention is adaptable to use in carrying out virtually any titration in which there is a potentiometric break. The break can be skewed or very broad, but as long as the curve above the threshold is approximately symmetrical there can be an accurate titration, for a small amount of non-symmetry in this area only introduces a negligible error. Any titration which can successfully be performed by standard or developed potentiometric techniques can be carried out by the present system, with more precise measurements being available than could previously be obtained by automatic methods, the results of the present system being equivalent to those previously available only through laborious techniques involving manual plotting of the titration curves and calculation of the end point. Where, for example, quality control for monitoring industrial processes is desired, such techniques are unsatisfactory, for they require too much time to perform. The present system not only automates such procedures, but also further speeds the titration by adding titrant during a fast motor operation, particularly where the samples being tested are known to be similar in characteristics. However, where the samples may vary substantially in characteristics, a slow motor may be used to meter the titrant, or the fast motor may be used for a short period of time to avoid overrunning the end point.

The system as described provides great flexibility, and it will be apparent to those of skill in the art that numerous modifications can be made without departing from the true spirit and scope of the invention. For example, the disclosed method contemplates a half-count mode where alternate pulses are fed to the accumulator; however, it will be apparent that this half-count can be obtained in numerous other ways without departing from the disclosed concept. For example, the count occurring above the threshold point can be separately accumulated at its full rate, and then divided in half by known data handling techniques before being added to the value accumulated prior to the threshold. It will also be seen that since the information obtained by the present system is in digital form, it is directly adaptable to computerizd data handling techniques, so that instead of the printed display described herein, the information can be fed directly to conventional data handling machines for further processing, storage, use in a process control system for correcting any errors in the process that might be detected by the titration, or the like. In view of the foregoing, it is desired that the description herein of preferred embodiments be taken as illustrative and that the true spirit and scope of the invention be limited only by the following claims.

What is claimed is:

1. A method of determining the end point of a potentiometric titration, comprising the steps of:
   adding titrant to a sample at a measured rate;
   measuring changes in the pH potential of said samples as titrant is added and determining the first derivative of said potential;
   measuring the full amount of titrant added to said sample until said first derivative reaches a preset value; and
   thereafter measuring one-half the titrant added through the endpoint of said titration until said first derivative returns to said preset value.

2. The method of claim 1, wherein the measurement of titrant added to said sample includes:
   generating electrical signals which represent unit quantities of titrant delivered to said sample; and accumulating said signals.

3. The method of claim 2, wherein said electrical signals are digital representations of the quantity of titrant delivered, said digital signals being accumulated to provide a continuous record of the quantity of titrant added to said sample.

4. The method of claim 3, further including the step of halting said titration when said first derivative returns to said preset value.

5. The method of claim 4, wherein the measurement of titrant added to said sample further includes:
   accumulating all of the said digital signals generated before said first derivative reaches said preset value; and
   accumulating one-half of the said digital signals thereafter generated.

6. The method of claim 5, further including the step of displaying a value represented by said accumulated digital signals to obtain the volume of titrant added to said sample to reach the said end point.

7. The method of claim 6, wherein the step of displaying a value includes the steps of summing the digital signals accumulated before said preset first derivative value is reached with the digital signals thereafter accumulated, the value of said sum representing the total volume of titrant added to reach said end point.

8. A method of determining the end point of potentiometric titration comprising:
   adding titrant to a sample at a controlled rate;
   measuring the amount of titrant added to said sample;
   generating electrical signals representing the measured amount of titrant;
   measuring changes in the potential of said sample as titrant is added;
   obtaining the first derivative of said potential;
   accumulating said electrical signals at a first rate until said first derivative reaches a predetermined value; and
   thereafter accumulating said electrical signals at a second rate until said derivative returns to said value.

9. The method of claim 8, further including selecting said predetermined value sufficiently near the maximum value of said first derivative that said derivative is substantially symmetrical about said maximum value above said predetermined value.

10. The method of claim 9, wherein the said second rate of accumulation of said electrical signals is one-half the said first rate of accumulation.

11. The method of claim 10, further including the step of halting said titration when said first derivative returns to said predetermined value, and thereafter obtaining directly from the accumulated electrical signals the amount of titrant added to reach the end point of said titration.

12. A method of determining the amount of titrant added to a sample to reach the end point of potentiometric titration, comprising:
   supplying titrant to a sample at a controlled rate;
   generating at least one digital electrical pulse for each unit quantity of titrant added to said sample;
   measuring changes in the potential of said samples as titrant is added;
   obtaining a variable signal representing the first derivative of said potential, said variable signal having a maximum value at the end point of said titration;
   determining a threshold value of said first derivative signal;
   counting the pulses generated during said titration;
   accumulating the full count of said pulses until said first derivative signal reaches said threshold value and thereafter accumulating one-half the count of said pulses; and
   halting said titration after said first derivative signal passes through said maximum value and returns to said threshold value.

13. The method of claim 12, further including supplying said titrant to said sample at a first rate until a predetermined quantity has been dispensed, and thereafter supplying titrant at a second rate.

14. The method of claim 13, further including the step of reading the accumulated pulse count to provide a direct indication of the volume of titrant added to said sample to reach said end point.

15. The method of claim 14, including the step of selecting said predetermined threshold value sufficiently near the maximum value of said first derivative that said derivative is substantially symmetrical about said maximum value and above said threshold.

16. The method of determing the amount of titrant added between the first and second equivalence points of a complex sample having two potentiometric breaks in the titration curve, including:
supplying titrant to said sample at a controlled rate;
generating at least one digital electrical pulse for each unit quantity of titrant added to said sample;
measuring changes in the potential of said sample as titrant is added;
obtaining a variable signal representing the first derivative of said potential, said variable signal having a maximum value for each equivalence point of said titration;
determining a threshold value of said first derivative signal, said threshold value being selected to be sufficiently near each of said maximum values of said first derivative that said derivative is substantially symmetrical about each maximum value and above said threshold;
counting the pulses generated during said titration;
accumulating one-half said count while said variable signal exceeds said threshold value and accumulating the full value of said count between said first and second equivalence points while said variable signal is below said threshold value, the total count so accumulated representing the amount of titrant added to carry said sample from said first to said second equivalence points.

17. In a potentiometric titrator for determining the equivalence point of a sample, apparatus for providing a direct and accurate measure of the volume of titrant added to said sample in reaching said equivalence point, comprising:
a sample cell for receiving a sample to be titrated;
means for supplying titrant to said sample cell;
means for generating electrical signals corresponding to the volume of titrant supplied;
means for measuring the electrical potential of said sample and producing an output corresponding to the first derivative of said potential;
means for storing all of said electrical signals until said first derivative reaches a predetermined value and for thereafter storing only a predetermined portion of said electrical signals; and
means responsive to said first derivative output for halting said titration when said first derivative returns to said predetermined value.

18. The apparatus of claim 17, further including means responsive to said first derivative output for producing a threshold signal when said output reaches said predetermined value, said means for storing electrical signals responding to the occurrence of said threshold signal to store only said predetermined portion of said electrical signals.

19. The apparatus of claim 18, further including means for reading out the total value of said stored electrical signals to obtain the total volume of titrant supplied to reach said equivalence point.

20. The apparatus of claim 18, wherein said means for reading includes display means.

21. The apparatus of claim 17, wherein said means for generating electrical signals includes pulse means for producing at least one pulse per unit volume of titrant delivered.

22. The apparatus of claim 21, wherein said means for storing electrical signals comprises counter means for counting said pulses.

23. The apparatus of claim 22, wherein said means for storing electrical signals includes gate means responsive to said first derivative output, said gate means operating in a full count mode to deliver all of said pulses to said counter means umtil said first derivative reaches said predetermined value, said gate means thereafter operating in a half-count mode to deliver only alternate pulses to said counter means.

24. The apparatus of claim 23, wherein said gate means includes means responsive to said first derivative output for producing a threshold signal when said output reaches said predetermined value, and a count gate responsive to said threshold signal, said threshold signal shifting said count gate from a full count mode to a half-count mode.

25. The apparatus of claim 24, further including readout means for obtaining a direct indication of the accumulated count in said counter, and thus of the total volume of titrant added to said sample.

26. The apparatus of claim 17, wherein said means for supplying titrant includes burette means for delivering metered quantities of titrant to said cell, and electric motor means for driving said burette at a controlled speed.

27. The apparatus of claim 26, wherein said means for generating electric signals comprises means responsive to the operation of said burette to generate at least one electrical pulse for each unit volume of titrant delivered by said burette.

28. The apparatus of claim 27, wherein said burette is operated by a rotary, motor-driven shaft, and said pulse generating means comprises photoelectric means reponsive to the rotation of said shaft for producing a plurality of pulses for each rotation of said shaft.

29. The apparatus of claim 27, further including control means for said electric motor means for selectively driving said burette at one of two speeds.

30. The apparatus of claim 27, wherein said means for storing said electrical signals comprises counter means for receiving said generated electrical pulses and for accumulating a count corresponding to the number of pulses received.

31. The apparatus of claim 30, wherein said means for storing said electrical signals further comprises count gate means having a full count mode and a half-count mode, said count gate shifting from one mode to the other when said first derivative reaches said predetermined value.

32. The apparatus of claim 31, further including readout means for displaying the count accumulated in said counter and to display the volume of titrant added to said sample.

33. The apparatus of claim 17, wherein said means for measuring the electrical potential of said samples includes electrode means for immersion in said sample, said electrodes producing a potential difference which is a measure of the pH of said sample, and circuit means connected to said electrodes for producing the first derivative of said electrode potential difference.

34. The apparatus of claim 33, further including trigger means responsive to a predetermined value of said first derivative, said trigger means producing an output threshold signal as long as said first derivative exceeds said predetermined value.

35. The apparatus of claim 34, wherein said means for storing said electrical signals includes count gate means responsive to said threshold signal, said count gate means operating in a full count mode to store all of said electrical signals in the absence of said threshold signal and operating in a half-count mode to store only alternate ones of said electrical signals in the presence of said threshold signal.

36. The apparatus of claim 35, wherein said means for generating electric signals comprises burette means for delivering metered quantities of titrant to said cell, and means responsive to the operation of said burette to generate at least one electrical count pulse for each unit volume of titrant delivered by said burette.

37. The apparatus of claim 36, wherein said means for generating electric signals further comprises second trigger means for supplying said electrical count pulses to said count gate means.

38. The apparatus of claim 37, wherein said means for storing said electrical signals comprises counter means responsive to count pulses passed by said count gate, said count gate being operative in its full count mode to pass all of said count pulses to said counter means, and being operative in its half-count mode to pass alternate ones of said count pulses.

39. In a potentiometric titrator for automatically determining the volume of titrant added to a sample to reach the end point of a titration;
   a sample cell for receiving a sample to be titrated;
   burette means for delivering metered quantities of titrant to said cell, and electric motor means for driving said burette;
   motor control logic circuit means for regulating the speed of said electric motor means;
   means responsive to the operation of said burette to generate at lease one count pulse for each unit volume of titrant delivered by said burette;
   counter means for receiving said count pulses and for accumulating a count corresponding to the number of pulses received;
   count gate means interposed between said means for generating count pulses and said counter means, said count gate having a full count mode wherein all of said generated count pulses are passed to said counter means and having a half-count mode wherein only one-half of said generated count pulses are passed to said counter means;
   means for measuring the potential of said sample during titration thereof, and circuit means for producing the first derivative of said potential;
   means responsive to a predetermined value of said first derivative to produce a threshold signal; and
   circuit means for applying said threshold signal to said count gate to shift said count gate from a full count mode to a half-count mode and for holding said count gate in the half-count mode as long as the value of said first derivative exceeds said predetermined value.

40. The apparatus of claim 39, wherein said motor control logic circuit means includes a delivery selector network responsive to said counter means, said delivery selector network producing an initial delivery signal upon delivery of a predetermined volume of titrant to said sample, said motor control circuit being responsive to said initial delivery signal to change the speed of said electric motor means, whereby an initial quantity of titrant can be added to said sample at a different rate than the rate at which the remainder of titrant is added.

41. The apparatus of claim 40, further including inhibit circuit means for inhibiting the production of said threshold signal, said delivery selector network including means for producing a permit signal subsequent to said initial delivery and upon delivery of an additional predetermined volume of titrant, said permit signal disabling said inhibit circuit means.

42. The apparatus of claim 41, wherein said motor means includes a high speed and a low speed motor, and wherein said motor control logic circuit means includes switching means for selectively energizing said motors, said switching means initially energizing said high speed motor and being responsive to said initial delivery signal to de-energize said high speed motor and energize said low speed motor.

43. The apparatus of claim 42, further including means responsive to the termination of said threshold signal for disabling said count gate and for de-energizing said electric motor means.

44. The apparatus of claim 43, further including means for reading out the total count accumulated in said counter means to obtain the total volume of titrant delivered to said sample to reach said end point.

* * * * *